United States Patent
Züncker et al.

(10) Patent No.: US 9,130,767 B2
(45) Date of Patent: Sep. 8, 2015

(54) METHOD, SYSTEM AND SIGNAL GENERATOR FOR QUALITY DETERMINATION OF AN IP NETWORK CONNECTION

(75) Inventors: Olaf Züncker, Bad Oldesloe (DE); Michael Krüger, Koelln-Reisiek (DE); Steffen Otto, Hamburg (DE)

(73) Assignee: VOIPFUTURE GMBH, Hamburg (DE)

( * ) Notice: Subject to any disclaimer, the term of this patent is extended or adjusted under 35 U.S.C. 154(b) by 230 days.

(21) Appl. No.: 13/120,128

(22) PCT Filed: Sep. 18, 2009

(86) PCT No.: PCT/EP2009/062121
§ 371 (c)(1),
(2), (4) Date: Jun. 6, 2011

(87) PCT Pub. No.: WO2010/031841
PCT Pub. Date: Mar. 25, 2010

(65) Prior Publication Data
US 2011/0228692 A1    Sep. 22, 2011

(30) Foreign Application Priority Data
Sep. 22, 2008 (EP) ..................... 08164789

(51) Int. Cl.
*H04L 12/26* (2006.01)
*H04L 29/06* (2006.01)
*H04L 12/24* (2006.01)

(52) U.S. Cl.
CPC ............ *H04L 12/2697* (2013.01); *H04L 43/50* (2013.01); *H04L 65/602* (2013.01); *H04L 65/604* (2013.01); *H04L 65/80* (2013.01); *H04L 41/5087* (2013.01)

(58) Field of Classification Search
USPC ........................................ 370/241, 250, 252
See application file for complete search history.

(56) References Cited

U.S. PATENT DOCUMENTS

| 2002/0167937 | A1 | 11/2002 | Goodman |
| 2003/0048812 | A1 | 3/2003 | Gross |
| 2006/0104218 | A1 | 5/2006 | Kako |
| 2007/0127391 | A1* | 6/2007 | Goodman ............... 370/252 |
| 2009/0231438 | A1* | 9/2009 | Srivastava et al. .......... 348/180 |

FOREIGN PATENT DOCUMENTS

EP    1793528    6/2007

OTHER PUBLICATIONS

Translation of International Preliminary Report on Patentability for international application No. PCT/EP2009/062121.
International Search Report mailed Nov. 19, 2009 for PCT/EP2009/062121.
European Search Report mailed Feb. 23, 2009 for EP 08164789.

* cited by examiner

*Primary Examiner* — Michael Thier
*Assistant Examiner* — Feben M Haile
(74) *Attorney, Agent, or Firm* — Lowe Hauptman & Ham, LLP

(57) ABSTRACT

The present invention relates to a method, a system and a VoIP signal generator for determining the quality of an IP network connection, comprising the steps of generating a measuring signal by way of a signal generator for measuring the quality of an IP network connection; determining, by way of the signal generator, for each of the generated at least one measuring signal the respective signal quality of each generated measuring signal; and simultaneously transmitting the at least one measuring signal and the respective quality information over the IP network connection to a receiver.

12 Claims, 2 Drawing Sheets

METHOD, SYSTEM AND SIGNAL GENERATOR FOR QUALITY DETERMINATION OF AN IP NETWORK CONNECTION

CROSS REFERENCE TO RELATED APPLICATION

This application claims the priority of European patent application No. 08164789.3, filed on Sep. 22, 2008 in the European Patent Office, the disclosure of which is incorporated herein in their entirety by reference. Further, this application is the National Phase application of International Application No. PCT/EP2009/062121, filed Sep. 18, 2009, which designates the United States and was published in German. Each of these applications is hereby incorporated by reference in their entirety into the present application.

The present invention relates to the field of Internet telephony, in short VoIP (Voice over Internet Protocol). In particular, the invention relates to a method, a system and a signal generator for quality determination of an IP network connection.

VoIP (Voice over Internet Protocol) is a technology that makes it possible to transmit the continuous audio stream of a telephone call in the form of data packets over a packet-oriented network (IP network). In contrast to other forms of data transmission in IP networks, the medium speech (audio), if transported in the form of data packets, requires a continuous data flow where the packets are always transmitted at the same time intervals (isochronously). IP networks, however, are not generally suitable to guarantee the isochronous transmission of a stream of data packets. Moreover, the VoIP data packets compete with the data packets of other applications for the same transmission infrastructure (IP network and its active components). The IP network may be a local area network (LAN) and/or a wide area network (WAN).

Therefore, VoIP data transmission is subject to numerous interferences resulting in a poor quality—e.g. a poor speech quality. For avoiding poor quality as far as possible, producers of VoIP systems usually suggest testing the IP networks for their VoIP capabilities before using a VoIP system. These tests (also called VoIP assessment, VoIP pre-deployment etc.) involves feeding simulated VoIP traffic into the IP network to be tested and assessing the transmission quality after transmission. If the test results are poor, the efficiency of the IP network may be enhanced (greater band width, traffic prioritisation, physical and/or logical restructurisation, other active components etc.).

If the VoIP capability of an IP network is to be tested, simulated VoIP traffic is to be provided by so-called load or call generators. The simulated VoIP traffic has to correspond to the VoIP traffic of the device planned to be used. Moreover, the simulated VoIP traffic has to meet the requirements of an undisturbed, ideal measuring signal (e.g. isochronous, complete, having the correct order etc.).

Since the VoIP calls are only transmitted between a transmitter and a receiver (as remote end), the call generators are usually also capable of receiving or terminating VoIP calls. Thus, two devices are always necessary for generating a VoIP call—a transmitting and a receiving call generator. The receiving call generator tests the IP network for its VoIP capability using the received measuring signals. However, the received measuring signal is subject to two different interfering influences—the influence of the IP network to be tested and the influence of the transmitting call generator. In practice, however, it is basically assumed that the measuring signal generated by the call generator has a suitable (good) quality—a poor quality is thus exclusively attributed to the IP network. Moreover, the assessment methods on the receiver side are often quite inaccurate due to the calculation of a quality factor and do not allow for a definite distinction between good and poor quality. It is by no means possible with these methods to distinguish whether a poor quality has to be attributed to the IP network to be tested or already to the transmitting call generator.

Basically, there are two different types of call generators available—hardware and software. In laboratories of VoIP producers and for carriers, very expensive, powerful hardware generators are preferred which often consist of specific hardware modules and are capable of generating thousands of simultaneous VoIP calls of high quality (isochronous). However, they are disadvantageous in that due to their sizes and for economic reasons, they are unsuitable for a flexible use in the aforementioned pre-deployments, which are made outside test laboratories.

Alternatively, software-based call generators are available, e.g. on CDs or as download. The user is then responsible for downloading or installing this software on a (mostly inexpensive) computer (often laptop). The producers/providers of the software-based call generators can no longer control this signal generation process—therefore, it is no longer possible to provide reliable information on the quality of the measuring signal that is later generated. Since computers are no special hardware, the stability (isochronicity) of the simulated VoIP traffic can by no means be guaranteed. Although the generation of an isochronous VoIP call already involves considerable difficulties, software-based call generators allow for the generation of numerous simultaneous VoIP calls.

The instability of the generated VoIP calls is, e.g. due to hardware performance (processor, timing device, RAM etc.), the system software or its interrupts (Windows, Linux etc.), the VoIP call generation and other background applications on the same computer.

Interferences are often highly sporadic and non-reproducible. It is neither predictable when a simulated VoIP call has a poor quality nor which or how many VoIP calls are of poor quality. Thus, on principle, the quality of a measuring signal is unknown.

If an actually or latently/possibly unstable measuring signal is used, it cannot be definitely decided on the receiver side whether the measured poor quality has to be attributed to the IP network to be tested or whether it has already been caused by the instable transmitter (transmitting call generator). Consequently, the result of the pre-deployment is virtually unusable.

It is not possible to generate stable, i.e. isochronous, VoIP calls using software-based call generators in combination with simple, inexpensive computers. It is therefore the object of the present invention to make it possible to avoid measuring errors generated by instable measuring signals during the quality determination of IP network connections. US 2003/048812 describes a method according to the preamble of claim 1.

Above-stated object is achieved by the features of the claims. The present invention is based on the idea that the call generator itself monitors the quality (e.g., isochronicity, packet loss etc.) of the VoIP call it has generated. According to the present invention, the isochronicity (hereinafter the term isochronicity shall encompass all further disturbances, such as packet loss) of the call generator and the respective automatic reaction of the call generator is permanently monitored.

According to a first aspect, the present invention provides a method of determining the quality of an IP network connection. According to the present invention, a signal generator generates at least one measuring signal for measuring the quality of an IP network connection. Moreover, the signal generator determines for each of the at least one generated measuring signals the signal quality of each generated measuring signal. Then, the at least one measuring signal and the respective quality information are simultaneously transmitted to the receiver via the IP network connection.

According to the invention, the at least one received measuring signal and the respective quality information are evaluated by a receiver, e.g., belonging to a signal generator of the remote end. The receiver uses the quality information transmitted for each measuring signal to reject those signals whose quality is already insufficient for the measuring task already when being generated by the signal generator.

Preferably, the signal generator transmits the determined quality information at the end of the measuring signal. Alternatively, the signal generator transmits the determined quality information at the end of a whole measuring signal series.

Preferably, the signal generator simultaneously generates x measuring signals.

According to a preferred embodiment, the signal generator analyses during the signal transmission the determined signal quality of the x generated measuring signals and repeats the signal generation if the number of simultaneously generated measuring signals is insufficient. Alternatively, the signal generator analyses the determined signal quality of the x generated measuring signals during the signal transmission and repeats the signal generation of the measuring signals with a number smaller than x if the number of simultaneously generated measuring signals of sufficient quality is insufficient.

It is moreover preferred that information describing the exact point in time of the interference is determined as quality information.

According to the invention, each measuring signal is a simulated Voice over IP call.

According to a further aspect, a system for the quality determination of an IP network connection is provided. The system comprises a signal generator for generating at least one measuring signal for measuring the quality of an IP network connection. The signal generator determines for each of the generated at least one measuring signals the respective signal quality of the respective measuring signal during the generation of the measuring signal and transmits the at least one measuring signal and the respective quality information simultaneously over the IP network connection to a receiver belonging e.g. to a signal generator of the remote end.

According to a third aspect, the present invention provides a signal generator for determining the quality of an IP network connection. The signal generator according to the invention comprises means for generating at least one measuring signal for measuring the quality of an IP network connection, means for determining the signal quality of each of the generated at least one measuring signals, means for simultaneously transmitting a measuring signal and the respective quality information and a receiver, e.g., belonging to the signal generator of the remote end for evaluating the measuring signals transmitted over the IP network connection as well as the respective quality information.

According to a further aspect of the present invention, a device for receiving and evaluating at least one measuring signal transmitted over an IP network connection and the respective quality information is provided. The device according to the invention comprises means for selectively rejecting received measuring signals or, alternatively, only the sequences of received measuring signals not having the necessary quality of a measuring signal when being generated upon evaluation of the respective quality information.

Moreover, the present invention provides a method of determining the quality of an IP network connection. The method comprises the following steps: receiving, by a signal receiver, at least one measuring signal for measuring the quality of an IP network connection and a respective quality information simultaneously transmitted with the at least one measuring signal determined on the transmitter side; evaluating the respective quality information; and rejecting on the receiver side the received measuring signals or, alternatively, only sequences of the received measuring signals lacking the necessary quality of a measuring signal already when being generated.

The present invention will be illustrated in the following in more detail by the attached drawings, in which.

Figure 1:
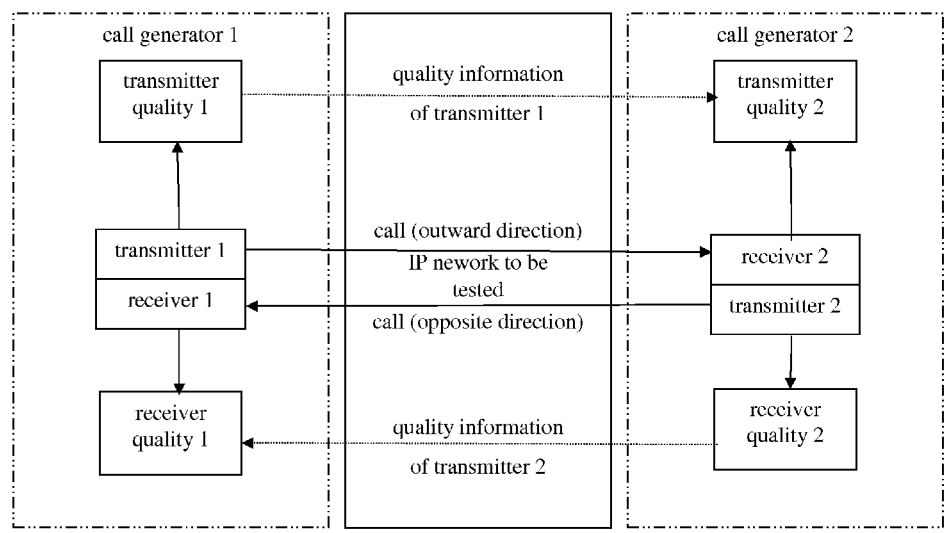
FIG. 1 shows a schematic view of a preferred embodiment of the present invention.

As shown in FIG. 1, according to a preferred embodiment of the present invention, the call generator or signal generator (e.g. transmitter 1) permanently assesses by means of measurements whether the quality of each VoIP call simultaneously generated by it satisfies the quality of an ideal measuring signal or not. This results in a "yes/no" information on the transmitter quality 1.

This "yes/no" information on quality is preferably generated in relation to the call. Should the call generator detect during a simulated VoIP call a poor quality even though only once or for a short period, the whole VoIP call is classified as having a poor quality. This quality information generated on the transmitter side is then transmitted by the transmitting call generator either at the end of the VoIP call or at the end of the VoIP call series (measuring task) to the receiving call generator (e.g. receiver 2). The receiving call generator is thus capable of rejecting from the whole amount of received VoIP calls those already having a poor quality when being generated (e.g. transmitter quality 1) and thus being unsuitable for a pre-deployment.

FIG. 1 shows two call generators 1 and 2 in communication with each other. For calls in the outward direction, i.e. from call generator 1 to call generator 2, call generator 1 forms transmitter 1 whereas call generator 2 forms receiver 2. The transmitter quality 1 for this signal is determined by call generator 1, transmitted as the quality information as regards transmitter 1 and evaluated by call generator 2. There, the receiver quality 2 is determined in the same way.

For calls in the opposite direction, call generator 2 forms transmitter 2 whose transmitter quality 2 is determined and transmitted with the call.

Figure 2:
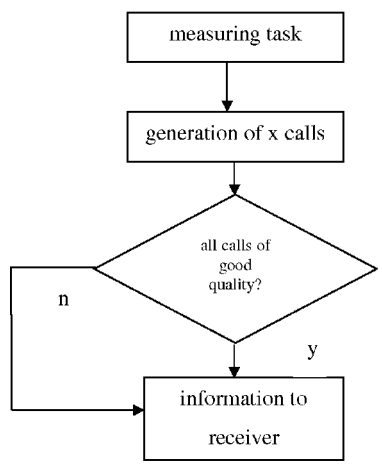
FIG. 2 shows a schematic view of the method according to the present invention.
Figure 4:
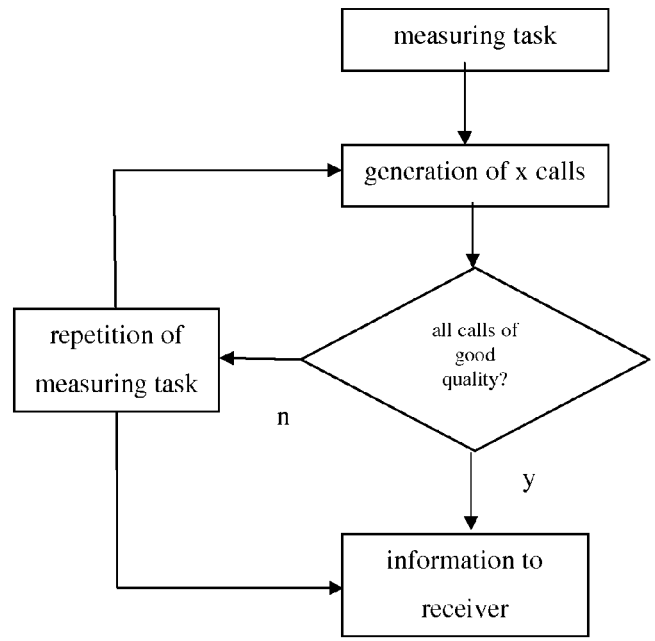
FIG. 4 shows a flow chart of an alternative preferred embodiment.

Since, according to the invention, the call generator has information on the quality of the VoIP calls it has generated, it is moreover capable in connection with the measuring task set (e.g., generation of a certain number "x" of simultaneous VoIP calls, cf. FIG. 2) of deciding even without quality information from the receiver whether the entire pre-deployment is successful or practically usable. If the number of simultaneously generated stable VoIP calls is insufficient, the call generator automatically decides to repeat the measuring task (pre-deployment) (cf. FIG. 4), the maximum number of repetitions of the measuring task being preferably limited.

In any case, the monitoring of the quality on the transmitter side, which is made simultaneously with the generation of the measuring signal, is a process independent of the generation of the VoIP call so as to avoid mutual influence.

Figure 3:
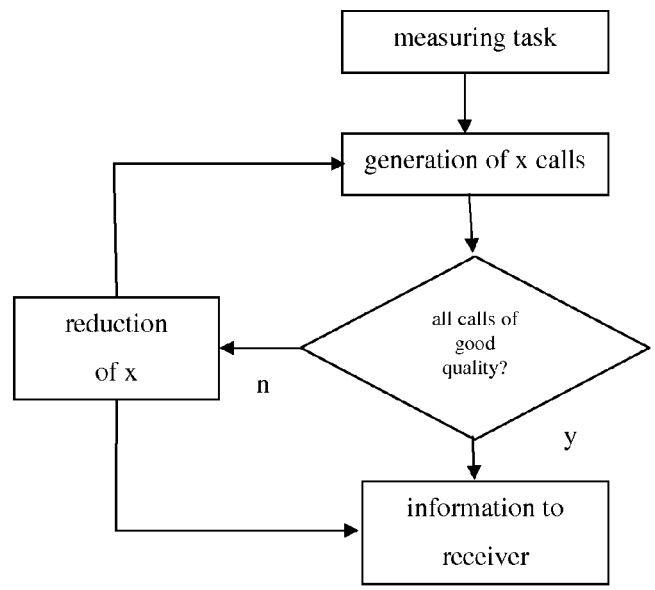
FIG. 3 shows a flow chart of a further preferred embodiment.

According to a further preferred embodiment, variations of the measuring task, such as a reduction of the number of simultaneous VoIP calls, is possible in addition to a mere repetition of the measuring task. This is shown in FIG. 3. The number of simultaneous VoIP calls can either be reduced when the measuring task is repeated or when the measuring task is executed. Thus, the call generator can be caused to generate exclusively isochronous VoIP calls. Information is retrieved whether all calls have a sufficient quality. If not, their number x is reduced and the generation of calls is restarted.

According to a further alternative of the present invention, the quality information on VoIP calls on the transmitter side are refined. It is for example conceivable to supply information on the exact point in time (e.g., packet number, time stamp) of an interference of the measuring signal to the receiver instead of a "yes/no" information. Preferably, the extent of the interference (such as type and number of interferences) is considered so that this method is applied only to slightly disturbed measuring signals and the time and effort spent on monitoring the measuring signal is reasonably restricted. The advantage of such a solution is that, using the interference information provided by the call generator on the receiver side of the call generator, at least slightly disturbed measuring signals may also be used for assessing the IP network as regards its VoIP capability, in that only the disturbed sequences of a measuring signal are rejected but not the whole measuring signal. Thus, the number of potential repetitions as described in the preceding paragraph is reduced.

The invention claimed is:

1. A method of determining a quality of an IP network connection, the method comprising:
generating, by a signal generator at a transmitter side, at least one measuring signal for measuring the quality of the IP network connection;
determining, by the signal generator, for each of the at least one generated measuring signal, a signal quality of said each generated measuring signal to provide respective signal quality information of said each generated measuring signal, wherein information describing an exact point in time and an type of interference are determined as the signal quality information;
simultaneously transmitting the at least one measuring signal and the respective signal quality information to a receiver over the IP network connection; and
evaluating, by the receiver, the transmitted at least one measuring signal and the respective signal quality information,
wherein the receiver uses the transmitted signal quality information on each measuring signal to reject those measuring signals whose signal quality is already insufficient for a measuring task when being generated by the signal generator.

2. The method according to claim 1, wherein the signal generator transmits the determined signal quality information at the end of or along with the corresponding measuring signal.

3. The method according to claim 1, wherein the signal generator transmits the determined signal quality information at the end of or along with a measuring signal series.

4. The method according to claim 1, wherein the signal generator simultaneously generates x measuring signals.

5. The method according to claim 4, wherein the signal generator analyses, during the signal transmission, the determined signal quality of the x generated measuring signals on the transmitter side, and repeats the signal generation if the number of simultaneously generated measuring signals of sufficient quality is not sufficient.

6. The method according to claim 4, wherein the signal generator analyses, during the signal transmission, the determined signal quality of the x generated measuring signals on the transmitter side, and repeats the signal generation of the measuring signals with a number smaller than x if the number of simultaneously generated measuring signals of sufficient quality is insufficient.

7. The method according to claim 1, wherein each measuring signal is a simulated Voice over IP call.

8. A signal generator configured to implement the method according to claim 1.

9. The signal generator according to claim 8, comprising:
generate the at least one measuring signal for measuring the quality of the IP network connection,
determine for each of the generated at least one measuring signal the respective signal quality information of said each generated measuring signal when being generated on the transmitter side, and
simultaneously transmit the at least one measuring signal and the respective signal quality information over the IP network connection to the receiver.

10. A system for determining a quality of an IP network connection, the system comprising:
a receiver; and
a signal generator, at a transmitter side, for generating at least one measuring signal for measuring the quality of the IP network connection,
wherein the signal generator is configured to
determine for each of the at least one generated measuring signal a signal quality of said each generated measuring signal when being generated on the transmitter side and provide respective signal quality information of said each generated measuring signal, wherein information describing an exact point in time and a type of interference are determined as the signal quality information, and
simultaneously transmit the at least one measuring signal and the respective signal quality information over the IP network connection to the receiver; and
the receiver is configured to evaluate the received at least one measuring signals and the respective signal quality information,
wherein the receiver is configured to use the transmitted signal quality information on each measuring signal to reject those measuring signals whose signal quality is already insufficient for a measuring task when being generated by the signal generator.

11. A device for determining a quality of an IP network connection, the device comprising:
a signal receiver for receiving at least one measuring signal for measuring the quality of the IP network connection and respective signal quality information simultaneously transmitted with the at least one measuring signal and determined by a transmitter, wherein information describing an exact point in time and a type of interference are determined as the signal quality information;
evaluating the received at least one measuring signal and the respective signal quality information; and a receiving call generator configured to selectively reject, upon evaluation of the at least one measuring signal and the associated signal quality information, the received at least one measuring signal when the evaluation indicates that the received at least one measuring signal already when being generated does not have necessary quality a measuring task.

12. A method of determining a quality of an IP network connection, the method comprising:

receiving, by a signal receiver, at least one measuring signal for measuring the quality of the IP network connection and respective signal quality information simultaneously transmitted with the at least one measuring signal and determined by a transmitter, wherein information describing an exact point in time and a type of interference are determined as the signal quality information;

evaluating the received at least one measuring signal and the respective signal quality information; and rejecting, by a receiving call generator, the at least one received measuring signal when the evaluating of the received at least one measuring signal and the respective signal quality information indicates that the at least one measuring signal is already of insufficient signal quality for a measuring task when being generated by the transmitter.

* * * * *